United States Patent [19]

Verbeek

[11] Patent Number: 5,001,474
[45] Date of Patent: Mar. 19, 1991

[54] SWITCHING MATRIX FOR TELECOMMUNICATION EXCHANGES

[75] Inventor: Robert J. M. Verbeek, Hilversum, Netherlands

[73] Assignee: AT&T Bell Laboratories, Murray Hill, N.J.

[21] Appl. No.: 341,988

[22] Filed: Apr. 21, 1989

[30] Foreign Application Priority Data

Apr. 25, 1988 [NL] Netherlands .................. 8801066

[51] Int. Cl.[5] .................. H04Q 1/00; H04Q 3/00
[52] U.S. Cl. .................. 340/825.79; 307/467; 340/825.9
[58] Field of Search .................. 340/825.79–825.96; 307/465, 466, 467, 255, 259, 262, 253, 254, 239, 270; 379/306

[56] References Cited

U.S. PATENT DOCUMENTS

| | | | |
|---|---|---|---|
| 3,550,088 | 12/1970 | Jones .................. | 340/825.93 |
| 4,346,381 | 8/1982 | Bauch et al. .................. | 340/825.93 |
| 4,553,044 | 11/1985 | Bittner .................. | 307/254 X |

OTHER PUBLICATIONS

K. B. Klaassen et al., "A Fast Unilateral Monolithic Switch for Analog Signals", IEEE Journal of Solid-State Circuits, Apr. 1978, vol. SC-13, No. 2, pp. 158-261.

Primary Examiner—Ulysses Weldon
Attorney, Agent, or Firm—R. T. Watland; L. C. Canepa

[57] ABSTRACT

A switch matrix for telecommunication including change-over switches which can be used for both analog and digital signal transmission. Each change-over switch includes a selector circuit, an input and an output stage. The output stage generally includes two transistors coupled in a push-pull arrangement which are connected directly to the supply voltage allowing the capacitive load of the switch to be charged or discharged rapidly. Also, the Miller effect of the internal base-collector capacitance is absent. Consequently, a large frequency range (to approximately 3 GHz) is realized for analog use, and a switch rate of approximately 2 Gb/s is attainable for digital use.

3 Claims, 2 Drawing Sheets

SWITCHING MATRIX FOR TELECOMMUNICATION EXCHANGES

BACKGROUND OF THE INVENTION

The invention relates to a switching matrix for telecommunication exchanges, in which an input conductor is optionally connectable to an output conductor by means of a change-over switch comprising a selecting circuit for actuating the change-over switch in response to a junction selection signal to be applied to the selecting circuit.

A change-over switch for such a switching matrix is known from the periodical "IEEE Journal of Solid State Circuits", Vol. SC-13, No. 2April 1978, pp. 258-261, especially FIG. 1.

The change-over switch described in the above correspondence comprises an amplifier section for analog signal transmission, and a selecting circuit. The amplifier section is constituted by a base-driven input transistor in whose collector line the input to a current mirror is realized. The output of this current mirror is serially connected to a diode-switched transistor whose emitter is connected to the emitter of the input transistor. The anode of the diode formed thus constitutes the signal output of the change-over switch.

The selecting circuit of this known change-over switch is formed by a current source which is serially interrruptably connected to the two emitters.

This known change-over switch is designed for switching through analog signals. The frequency band of this change-over switch for these signals stretches out to approximately 800 MHz; it further appears from the said pulication that when this change-over switch is actuated, there is a delay of approximately 5 ns and a rise time/fall time of approximately 10 ns.

Furthermore, the current which can be supplied to the load impedance by this change-over switch is limited to a maximum of the current flowing through the serially connected current source. Consequently, only a limited voltage swing over the output impedance is possible.

SUMMARY OF THE INVENTION

The invention has for its object to provide a switching matrix which is suitable for transmitting both analog and digital signals with the higher frequency than is possible in the aforementioned state of the art, and this with a sufficiently large output voltage.

For this purpose, the invention is characterized
in that the change-over switch comprises an input stage and an output stage connected thereto;
in that the input stage is designed with one input constituting the input to the change-over switch and two outputs, the input stage being designed for transmitting at a higher or lower d.c. level the input signal to these outputs;
in that the output stage comprises two transistors of a mutually complementary conductor type which are connected in a push-pull configuration with interconnected emitters, constituting the signal output of the change-over switch;
and in that the outputs of the input stage are connected to always a base of the transistors of the output stage.

Because the signal output of the change-over switch is formed by the interconnected emitters of the push-pull stage, the ever present capacitive load of that output (that is to say, the parasitic capacitance of the output conductor plus the output capacitances of the non-conductive remaining change-over switches connected to that output conductor) can be recharged rapidly by one of the two transistors and discharged rapidly by the other. This is enabled by the low output impedance of the two input transistors switched as emitter followers and together forming the push-pull stage.

Furthermore, the internal base-emitter capacitance of the push-pull transistors does not virtually affect the frequency behaviour of the change-over switch because the emitter assumes the same voltage as the base. Also the so-called Miller effect of the internal base-collector capacitance is absent because the collectors are directly connected to the supply voltage, so that no voltage gain occurs from the base to the collector.

Since one base of the push-pull stage is adjusted to one diode voltage above the output voltage, and the other base to one diode voltage below the output voltage, an input stage is required shifting the d.c. level of the signal to be applied by the said values.

An embodiment of the switching matrix in which the advantageous high-frequency properties of the change-over switch are maintained, is characterized
in that the input stage is formed by a series circuit of a first current source, a first diode, a second diode and a second current source, the cathode of the first diode being connected to the anode of the second diode and this junction forming the signal input to the change-over switch,
in that one of the outputs is formed by the anode of the first diode,
and in that the other output is formed by the cathode of the second diode.

A further embodiment of the switching matrix according to the invention is characterized
in that the selecting circuit is constituted by two groups each including k (k≧1) transistors having the same type of conductor per group, whose emitters are interconnected per group and whose collectors are interconnected per group, these groups being of a mutually complementary type of conductor,
in that the emitters of one or the other group, respectively, are connected to the base of one or the other transistor, respectively, in the push-pull stage,
and in that the bases of the transistors of both groups form the selection inputs to the selecting circuit.

If, as is customary, there is a bundle of conductors in the switching matrix for supplying this selection signal, and there is also a bundle for the inverse selection signal, the selection inputs of the first group can be connected to the conductors of the two bundles showing a first logic value on selection of the relevant junction, and the selection inputs of the other group to the remaining conductors then showing the complementary logic value. The address of the change-over switch is thus determined by the connection mode of each of the bundles of conductors, so that all change-over switches from the switching matrix can have an identical structure.

BRIEF DESCRIPTION OF THE DRAWING

The invention will be further explained with reference to the FIGS., in which.

DETAILED DESCRIPTION

Figure 1:
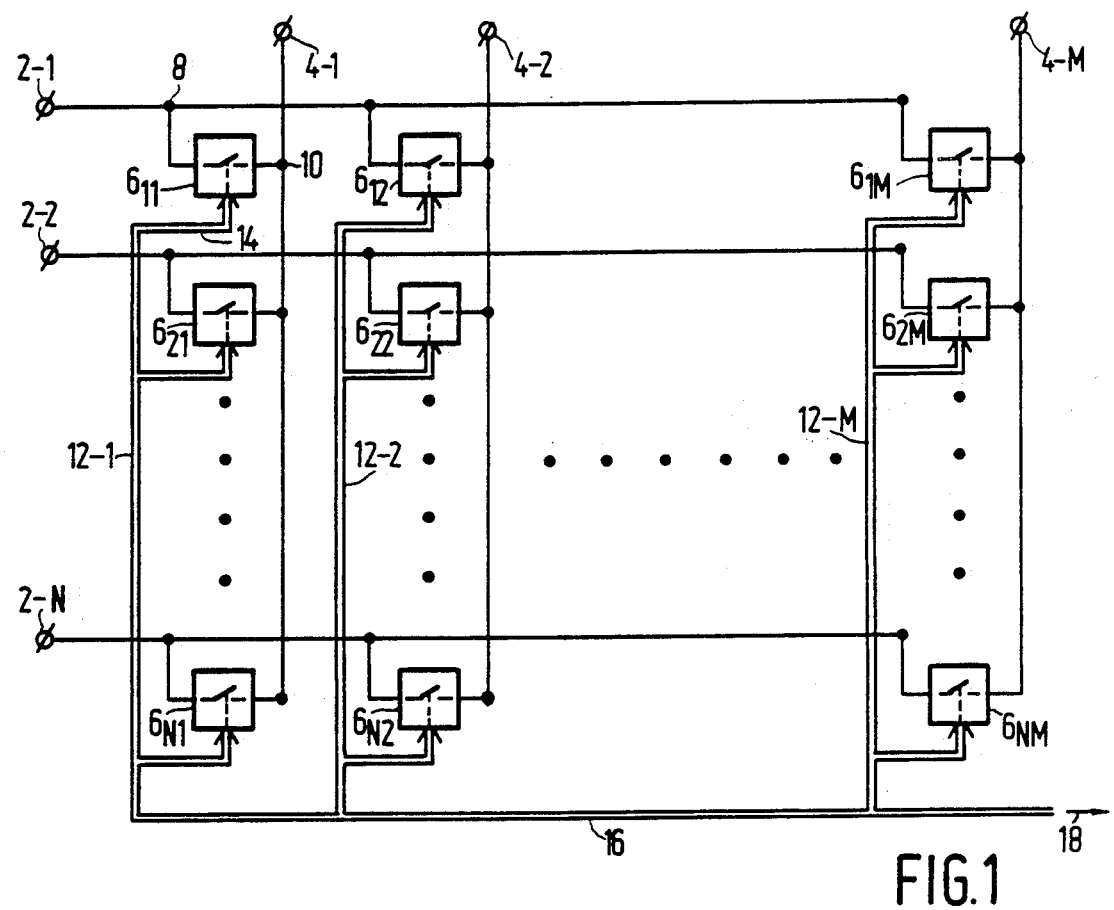
FIG. 1: shows the structure of a switching matrix having a plurality of change-over switches.

The switching matrix as shown in FIG. 1 consists of N input conductors 2-1 to 2-N and M output conductors 4-1 to 4-M. For the interconnection of these conductors there are present M×N change-over switches $6_{ij}$(i+1,2, ... ,N;j+1, 2, ... ,M), of which the signal input 8 is connected to the input conductor associated to the junction and of which the signal output 10 is connected to the output conductor associated to that junction. The switching matrix further includes conductor bundles 12-1 to 12-M through which the junction selection signal is transmitted to each of the junctions. Each conductor bundle 12 is branched off into a bundle of selection inputs 14 of a selecting circuit to be described hereinafter forming part of the change-over switch. The selection information is transmitted through a collective bundle 16 from the central control 18 (not shown) of the switching system in which the switching matrix is incorporated.

When in operation, a number of change-over switches will be conductive whereas the other change-over switches will be non-conductive. It will be appreciated that a single input is connected to no more than a single output, the vice versa. (In a telephone system this implies that no more than two subscribers communicate with each other per connection). Thus, if one of the change-over switches connected to a specific output conductor is conductive, the other change-over switches will be non-conductive, for no more than one input signal at a time is allowed to be transmitted to that output.

The selection of the conductive change-over switches is effected pe output conductor. If the number of change-over switches connected to that conductor is $2^k$ (thus N+$2^k$), k bits will be required for the selection of a junction. For reasons of simplicity of the circuit the conductor bundle can also transmit the inverse selection signal; in that case twice the amount of bits is required.

Figure 2:
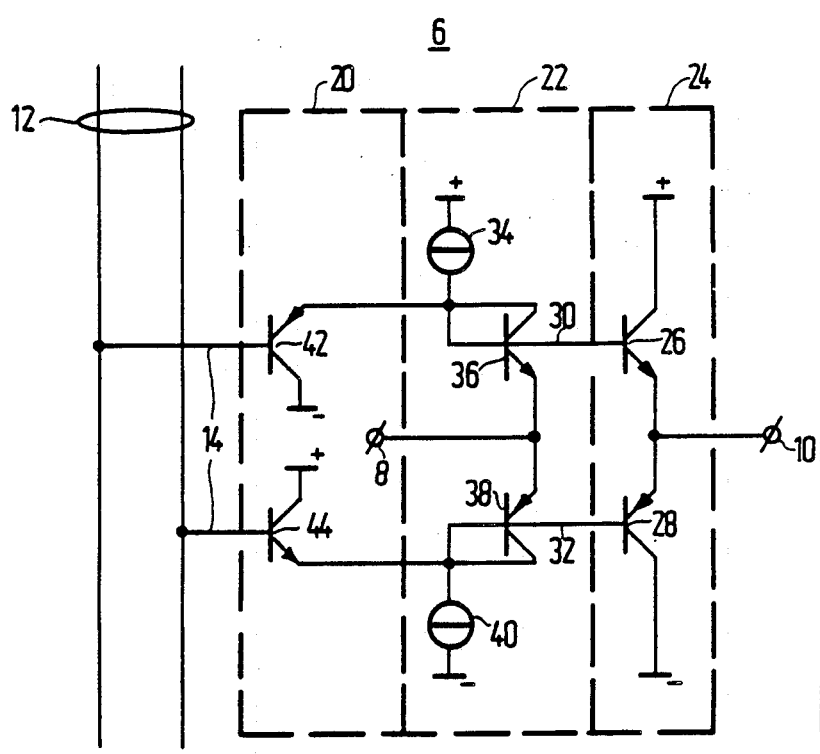
FIG. 2: shows an embodiment of a change-over switch to be used in a switching matrix.

FIG. 2 shows an embodiment of a change-over switch to be used in a switching matrix as shown in FIG. 1. This change-over switch 6 comprises a selecting circuit 20; an input stage 22 and an output stage 24.

Output stage 24 comprises an NPN transistor 26 and a PNP transistor 28 whose emitters are interconnected so that a push-pull configuration is realized. These interconnected emitters also form the signal output 10 of the change-over switch. The collectors of the transistors 26 and 28 are directly connected to the respective positive or negative supply voltage.

Input stage 22 is formed by a series arrangement of a current source 34, an NPN transistor 36 switched as a diode, a PNP transistor 38 switched as a diode and a current source 40, in that order. The emitters of the two transistors are interconnected, that is, the cathode of the first transistor 36 switched as a diode is connected to the anode of the second transistor 38 switched as a diode and form the signal input 8 of the change-over switch. The bases of the two transistors, that is, the anode of the first transistor 36 switched as a diode is connected to the cathode of the second transistor 38 switched as a diode form the outputs 30 and 32 of the input stage which outputs are connected to the bases of the respective transistors 26 and 28. The current sources 34 and 40 are connected to the respective positive and negative supply voltage.

Selecting circuit 20 is shown in FIG. 2 in the form of a PNP transistor 42 and an NPN transistor 44. The emitters of the respective transistors 42 and 44 are connected to the interconnected bases of the respective transistors 26 and 36, 28 and 38. The collectors of the respective transistors 42 and 44 are connected to the respective negative and positive supply voltage. The two bases of these transistors form the selection inputs of the change-over switch. These two selection inputs are each connected to a conductor of the conductor bundle 12 which transmits the junction selection signal.

The selecting circuit represented in FIG. 2 is only suitable for selecting a junction from a group of two. For selecting a junction from a larger group, a more extensive selecting circuit is required, as will presently be shown with reference to FIG. 3.

The functioning of the change-over switch 6 is as follows. It is assumed that the base of transistor 42 is maintained at a high voltage, for example the positive supply voltage, and that the base of transistor 44 is maintained at a low voltage, for example the negative supply voltage. With this adjustment of the selection signal, the change-over switch is adjusted to the conductive state. Because of the adjustment of transistors 42 and 44, the transistors 36, 38, 26 and 28 are conductive so that the transistors 36 and 38 conduct a specific current. Assuming that the transistors 26 and 36 are completely equal and transistors 28 and 38 are equal too, an equally large amount of current will pass through the series arrangement of the base-emitter diodes of the transistors 26 and 28 as through the series arrangement of the transistors 36 and 38 in the absence of a signal of input 8. The main current through the transistors 26 and 28 will now be the current gain factor of these transistors times as large, for example, a factor 100.

If the voltage at input 8 is varied, for example increased, the base voltage of the transistors 36 and 38 will be varied likewise because the diode voltage across these transistors remains substantially unchanged. The voltage across the base-emitter diode of the transistors 26 and 28 does not substantially change either, so that output 10 continues to carry the same voltage as input 8.

The current gain from input 8 to output 10 is equal to the current gain factor of the transistors, thus 100 in this numerical example. The high signal rate of the change-over switch, also with a capacitive load on output 10, is caused by the fact that this capacitor is charged and discharged from the emitters of the transistors 26 and 28, thus from a point of low impedance. This impedance is inversely proportional to the supplied current, so that with a large required current there is only a slight impedance which considerably adds to the signal rate of the change-over switch.

Figure 3:
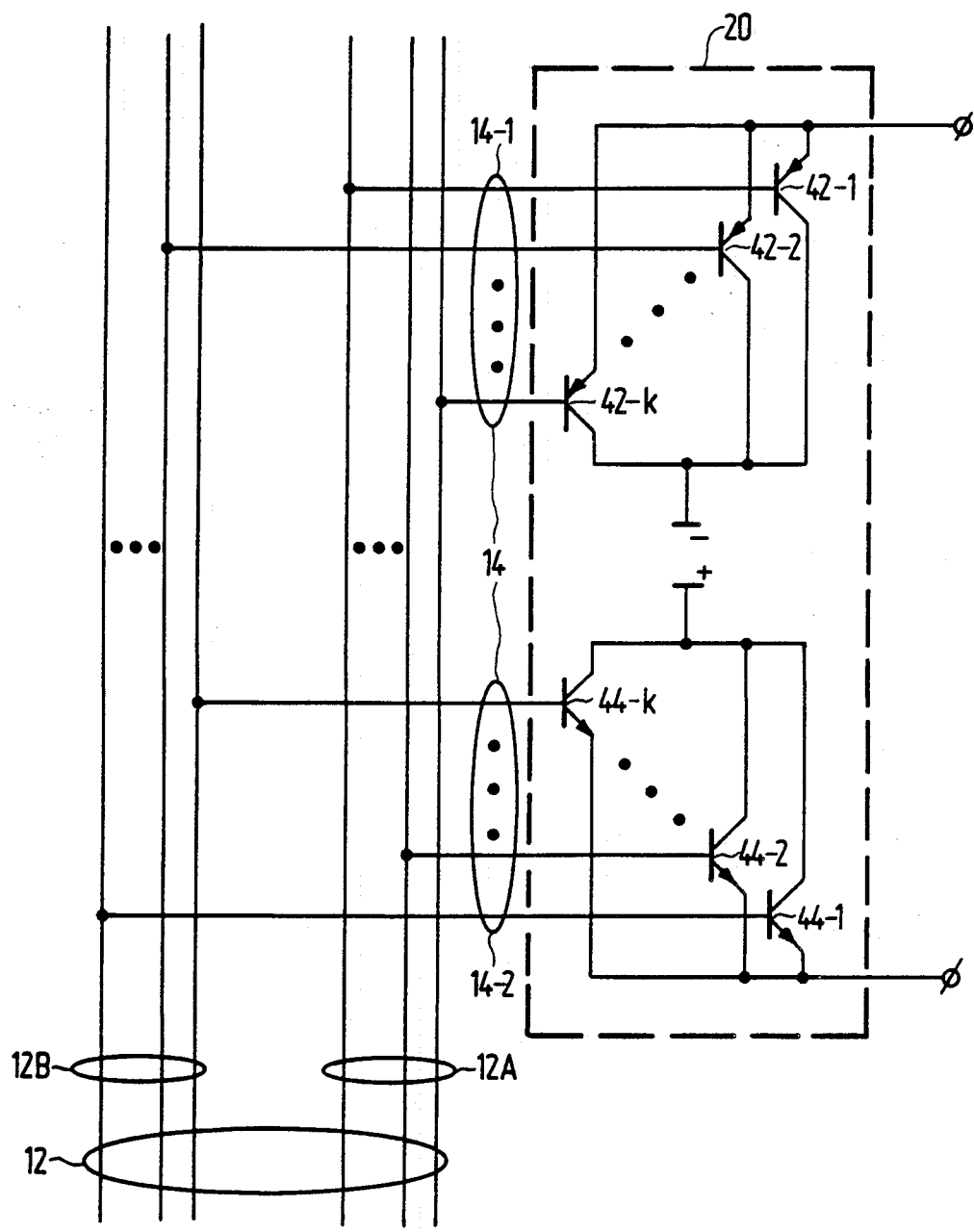
FIG. 3: shows an embodiment of a selecting circuit to be used in the cnage-over switch as shown in FIG. 2.

FIG. 3 shows an embodiment of selecting circuit 20, suitable for use in a change-over switch in a matrix comprising more than two junctions per output conductor. The selecting circuit is composed of two groups of transistors 42-1 to 42-k and 44-1 to 44-k. In each group the emitters are interconnected. These emitters form the outputs of the selecting circuit which are connected to the bases of transistors 36 and 38 (FIG. 2). In each group the collectors are connected to the negative or positive supply voltage, respectively. The bases of each group form the selection inputs 14 of the selecting circuit. The selection inputs 14 are divided into two groups 14-1 and 14-2. Group 14-1 is associated to the transistor group 42 and group 14-2 to the transistor group 44.

From group 14-1 all selection inputs are to be brought to a high voltage level (for example the positive supply voltage) so as to conduct the relevant output current, for group 14-2 a low voltage (for example the negative supply voltage) is required for this purpose. If not all selection inputs have reached the above-described voltage, change-over switch 6 will not be conductive.

The address of the change-over switch 6 is obtained by distributing the selection inputs of the groups 14-1 and 14-2 over the conductors of the conductor bundle 12, composed of two sub-bundles 12A and 12B. These sub-bundles show a mutually inverse bit pattern, allowing at a specific bit pattern each selection input to be optionally provided with a high or a low voltage level. IF a distribution of high voltages and low voltages occurs over the conductors of bundle 12 such that all the selection inputs 14-1 are high and all the selection inputs 14-2 are low, the junction to which this change-over switch is connected is selected to be the conductive switch. With all further distributions of high and low voltages over the conductors of bundle 12, always at least a single transistor from group 42 and also at least a single transistor from group 44 will be conductive, causing the bases of transistors 26 and 36 or 28 and 38, respectively, to be pulled to the negative or positive supply voltage, respectively, causing these transistors to be cut off. Consequently, the change-over switch will be non-conductive with any other high-low voltage combination (bit combination).

I claim:

1. A switching matrix for telecommunication exchanges configured to receive an input signal on an input conductor and optionally connect said input conductor to an output conductor by a change-over switch, said change-over switch comprising;
    a selecting circuit, an input stage and an output stage;
    said selecting circuit being coupled to said input stage;
    said selecting circuit actuating said input stage in response to a junction selection signal applied to said selecting circuit;
    said input stage including an input and two outputs, said input stage being configured to receive said input signal and to transmit said input signal at a higher or lower dc level to said outputs of said input stage; and
    said output stage comprising at least two transistors of a mutually complementary conductor type, said transistors each including a collector, a base and an emitter, said transistors being connected in a push-pull configuration with interconnected emitters, wherein the outputs of said input stage are connected to the base of said transistors in said output stage, and said interconnected emitters being connected to the output conductor.

2. A switching matrix as claimed in claim 1 wherein the input stage is formed by a series circuit of a first current source, a first transistor switched as a diode including a first cathode and a first anode, a second transistor switched as a diode including a second cathode and a second anode and a second current source, the first cathode of the first transistor switched as a diode being connected to the second anode of the second transistor switched as a diode to form the signal input to the change-over switch,
    one of the outputs of the input stage is formed by the first anode of the first transistor switched as a diode,
    and the other output of the input if formed by the second cathode of the second transistor switched as a diode.

3. A switching matrix as claimed in claim 1 or 2, wherein; the selecting circuit comprises two groups each including k(k≧1) transistors having the same type of conductor per group, whose emitters are interconnected per group and whose collectors are interconnected per group, these groups being of a mutually complementary type of conductor,
    the emitters of one or the other group, respectively, are connected to the base of one or the other transistor, respectively, of the push-pull stage,
    and the bases of the transistors of both groups form the selection inputs to the selecting circuit.

* * * * *

UNITED STATES PATENT AND TRADEMARK OFFICE
CERTIFICATE OF CORRECTION

PATENT NO. : 5,001,474

DATED : March 19, 1991

INVENTOR(S) : Robert J. M. Verbeck

It is certified that error appears in the above-identified patent and that said Letters Patent is hereby corrected as shown below:

Column 6, line 28, "if" should be --is--.

Signed and Sealed this

Fifteenth Day of December, 1992

Attest:

DOUGLAS B. COMER

*Attesting Officer*  *Acting Commissioner of Patents and Trademarks*